United States Patent [19]

Nieuwveld

[11] 3,905,570

[45] Sept. 16, 1975

[54] RESILIENT FASTENING DEVICES

[76] Inventor: Aril J. Nieuwveld, Herungerweg 379, Venlo, Netherlands

[22] Filed: Nov. 27, 1972

[21] Appl. No.: 309,731

[52] U.S. Cl. .................. 248/71; 24/73 AP; 85/5 R; 85/80; 248/216
[51] Int. Cl. ............................................ F16b 15/02
[58] Field of Search ............ 248/71, 225; 85/80, 83, 85/84, 5 R; 24/73 AP, 73 SA, 73 P, 213 CS

[56] References Cited
UNITED STATES PATENTS

| 3,154,281 | 10/1964 | Frank .................... | 248/71 |
| 3,213,745 | 10/1965 | Dwyer .................... | 85/83 |
| 3,252,677 | 5/1966 | Raymond .................. | 85/5 R |
| 3,315,558 | 4/1967 | Fischer ................... | 85/80 |
| 3,737,128 | 6/1973 | Schuplin ................. | 248/71 |
| 3,756,115 | 9/1973 | Schuplin ................. | 85/5 R |

FOREIGN PATENTS OR APPLICATIONS

| 1,020,694 | 2/1966 | United Kingdom ........... | 85/5 R |
| 1,135,580 | 12/1968 | United Kingdom ........... | 24/73 AP |
| 1,267,508 | 6/1961 | France ................... | 24/73 AP |

Primary Examiner—Marion Parsons, Jr.
Attorney, Agent, or Firm—Albert C. Johnston

[57] ABSTRACT

A resilient fastening device mountable simply by being thrust into a hole of appropriate size, and preferably made as a unitary molding of a synthetic resin such as a polyamide resin, comprises a head and a plurality of substantially parallel resilient legs spaced apart on and projecting from the head. Each leg has outward protrusions preferably formed by leg segments of approximately semi-frusto-conical shape, the outer edges of which normally extend beyond the hole diameter but can be fitted into the hole when the legs are pressed together as by being forced into the hole, whereupon the protrusions press outwardly against the wall of the hole even if it is irregular in diameter. The head of the device may comprise an article-retaining portion such as a resilient clip for a tool or like article, or a split circular clamp for a wire, cable, pipe or like object. A dual purpose form of the device has a backward section of each leg composed of several protrusion forming segments connected through a narrower intermediate segment with a forward section composed of a first protrusion forming segment connected with the head through a neck segment. Upon removal of the backward leg sections by severance of the intermediate segments, the remnant device is readily mountable in a shallow hole by forcing the first set of protrusions through the hole.

5 Claims, 10 Drawing Figures

RESILIENT FASTENING DEVICES

This invention relates to resilient fastening devices, made preferably from synthetic plastic material, which can be fastened securely in place by being thrust into a hole of appropriate diameter.

Swiss Patent No. 344,549 describes fastening devices made from synthetic plastic material which have the form of a solid cylinder provided with flexible lateral protrusions to be engaged with the side wall of a hole. In order to give a satisfactory result those devices require a rather regularly shaped hole having a diameter conforming to rather narrow limits. These requirements are often difficult to fulfill, especially when the hole is provided in a relatively soft material such as wood or is drilled in a brittle or masonry wall. Moreover, the force required for fastening those devices sometimes is so great that it can cause damage to the fastener.

The present invention provides resilient fastening devices which can be easily and quickly fastened without screws in a given hole even of irregular diameter, and which show surprisingly great holding power by virtue of their distinctive construction.

The fastening devices according to this invention are formed with two or more preferably parallel, resilient legs which are spaced apart at a substantial distance from each other and are provided with oppositely directed lateral protrusions, and the legs and the protrusions are so shaped that the legs upon being forced together into a hole of appropriate diameter will be converged so as to fit into the hole and become strongly fixed therein.

The diametrical distance between the outer edges of the respective protrusions of the legs in the direction across the space between the legs normally is considerably greater than the diameter of the hole in which the fastening device is to be mounted, yet when the legs are pressed together this distance approximately corresponds to or is but slightly larger than the hole diameter. Since the legs are resilient and normally are spaced apart, they can shift independently relative to each other when pressed together as by being inserted in the hole, and upon being so inserted they exert a reactive force upon the wall of the hole. By virtue of this force, the fastening device is fixed securely in the hole and, moreover, the legs can adapt themselves to a large extent to irregularities in the hole or its diameter.

It results that the fastening devices of the invention can be used with good results even in irregularly formed holes. A further advantage of these devices is that they ordinarily can be fastened in place by mere pressure of the thumb, without the use of any other tool such as a hammer.

Fastening devices according to the invention which have but two legs ordinarily give satisfactorily results. For some uses, however, it may be preferred to provide the devices with more than two legs, such, for example, as when even greater fastening power is required or in case of relatively large or heavier fastening devices being required. For simplicity, the invention is described hereinafter and illustrated by reference to devices having two legs, but it is to be understood that what is stated in regard to such devices applies mutatis mutandis to the corresponding fastening devices having three or more than three legs.

The lateral protrusions on the legs of the devices are provided in the form of knots, ridges or teeth, or combinations of them, which protrude outwardly from the body of each leg. The protrusions preferably present convex, or rounded, outer edges bordering respective surfaces thereof which lie in planes transverse to the axis of the legs and face in the direction away from the free ends of the legs. Exceptionally good results are obtained with leg formations composed in part or entirely or semi-frusto-conical segments.

The legs of the fastening devices ordinarily project in substantially parallel spaced relation from a head of any desired or suitable shape, each leg being in effect cantilevered from a base portion of the head. The legs preferably are formed integrally with the head but they of course may be mounted in or joined with portion of it in other ways. The contours of the head at its base should protrude laterally beyond the contours of the legs in those cases where the fastening device needs be prevented from sinking too deeply into the retaining hole.

The head can simply have the shape of a nail head, or it can be provided with any of a variety of article holding formations, such e.g. as one or more clasps, eyes, hooks, or clamps, for supporting tools, implements, wires, cables, pipes, or like objects.

In embodiments of the invention intended for fastening objects such as wires, cables, pipes or the like in fixed locations, it is advantageous to make the head with a looped or circular form which is split at the ends thereof and joined there with two separate head sections each of which has one of the two legs of the fastening devices projecting backwardly from it. The head thus constitutes an article encircling clamp which, upon a spreading of the legs, can easily be slipped over the wire, cable or pipe to be fastened and then, upon convergence of the legs, can be mounted securely in a hole. The result is a very quick and convenient fastening operation. In such embodiments, the looped or clamp portion of the head can constitute in effect an extension of the two legs.

In embodiments of the invention intended for use as a clip for supporting tools, implements or like articles, the legs of the fastening device preferably project directly from the base of the head, while the article-holding or clip portion projects oppositely at the other end of the head.

The fastening devices of the invention are designed primarily for installation in holes of structures having a considerable thickness, such as masonry walls, stones, wooden walls, skirtings and the like.

Surprisingly, however, it has been found that the invention can be embodied in a dual purpose fastening device which can be mounted not only in relatively thick structures but as well in shallow holes of relatively thin panels such as pegboards, plywood panels, steel plates and so on. In embodiments of the invention having this special dual utility, sections of the resilient legs adjacent to the head of the fastening device are formed so that they enable the device to be fastened in a shallow hole of a given diameter provided in a relatively thin panel, such as a pegboard or the like, for which purpose these sections are provided at an appropriate distance from the head with a first set of protrusions that can be self-locking against the back surface of the panel adjacent to the hole into which the fastening device is pressed. These protrusions preferably are formed by semi-frusto-conical segments connected with the head of the device via neck segments of semi-cylindrical cross-section which preferably taper to a lesser width in the direction from the head to the protrusions.

When such a dual purpose fastening device is to be installed in a shallow panel hole, it is in most cases desirable and often is necessary to remove those portions of the legs which extend beyond the first set of protrusions, which serve no purpose in this manner of installation. To facilitate such removal it is advantageous to provide an intermediate segment of reduced size between the first set of protrusions and the protrusions of the backward or tail section of each leg of the device.

The fastening devices of the invention are made from resilient material, preferably by being molded from a synthetic resin material having suitable resilience and strength. Synthetic resins of the polyamide type, such as "Nylon" molding resins, have proved to be particularly suitable. They have been found to exhibit all the qualities required for good performance of the devices.

The invention will be further understood upon consideration of the following detailed description and the accompanying drawings of illustrative embodiments thereof.

Each of the illustrated embodiments of the invention is a resilient fastening device made as an integral piece of a suitably strong, tough and resilient synthetic resin material. Each device is made, for example, by molding a Nylon or equivalent thermoplastic polyamide resin into a unitary structure having the form shown and having dimensions suited for the size of the hole in which the device is to be mounted. For instance, assuming the fastening devices to be intended for installation in holes of approximately 4 mm. in diameter, the diametrical distance between the outer edges of at least some of the protrusions on the legs of each device may be slightly greater than 4 mm., e.g., approximately 5 mm., in the direction seen in side view such as that of FIGs. 1A, 5 or 7A; while in the direction across the space between the legs, as seen in FIGS. 1, 2, 3, 4, 6 or 7, the diametrical distance between the outer edges of the protrusions normally is considerably greater, being e.g. of the order of about 7 mm., but becomes only slightly greater than 4 mm. when the legs of the device are pressed closely together.

Figure 1:
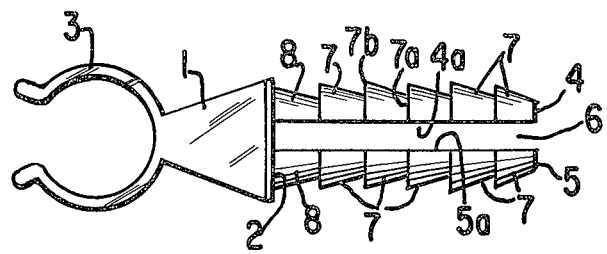
FIG. 1 and FIG. 1A are plan and side views, respectively, of one form of a fastening device according to the invention.
Figure 1A:
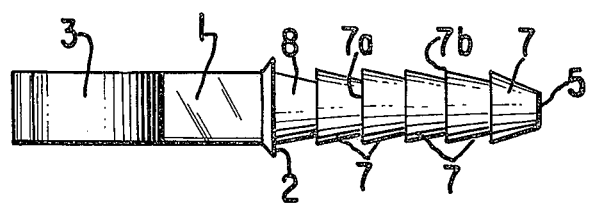

The fastening device as shown in FIGS. 1 and 1A comprises a head 1 of tapered form, the base 2 of which has lateral dimensions greater than the diameter of the hole in which the device is to be mounted. A clasp portion 3 shaped like a horseshoe is provided on the head to serve as a resilient holder for a small tool, appliance, wire, or like object pressed into the space between its arms.

Projecting straight backward from the base 2 of the head are two substantially parallel resilient legs 4 and 5 between which there is a space 6 into which either or both of the legs may be pressed against their inherent resiliency by force directed laterally upon them. For a fastening device intended to be mounted in a hole of approximately 4 mm. in diameter, the legs may be spaced apart, for example, by a distance of approximately 1.5 to 2 mm.

Each leg 4 or 5 has a substantially flat normally straight inner surface 4a or 5a and is formed as a series of several, in this embodiment five, similar segments 7 of approximately semi-frusto-conical form which join together coaxially and in turn join with the base 2 of the head through a neck segment 8 that may be of reduced semi-frusto-conical or semi-cylindrical form. The base of each segment 7 thus presents a substantially radially disposed surface 7a which faces away from the free end of the leg and is bounded by a convex, or rounded, outer edge 7b that typically is approximately semi-circular.

Accordingly, the two legs have a cross-sectional outline which normally is approximately oval but which becomes approximately circular when they are pressed together.

Figure 2:
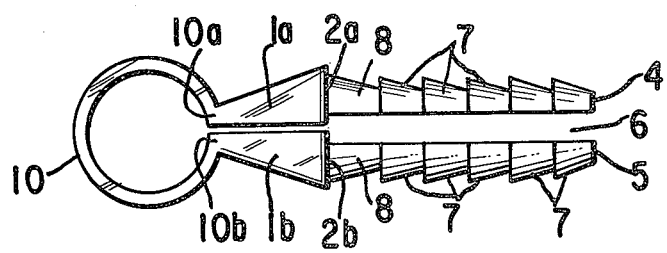
FIG. 2 is a plan view of an embodiment thereof having a split head suitable for uses as a wire clamp.
Figure 3:
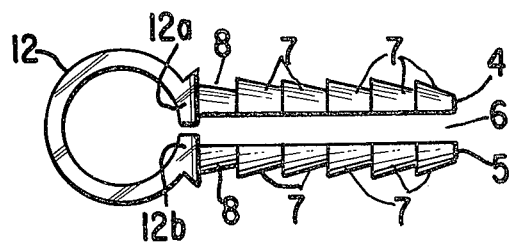
FIG. 3 is a plan view of a third embodiment wherein the legs project directly from split base portions of a circular head.

The leg formations of the embodiments shown in FIG. 2 and FIG. 3 are substantially the same of those of the embodiment shown in FIGS. 1 and 1A.

In the embodiment of FIG. 2, the head of the fastening device is in effect split into two separate butting sections 1a and 1b. The legs 4 and 5 are joined respectively to the base portions 2a and 2b of these head sections, and an article holding or clamp portion 10 of split circular form has its ends 10a and 10b joined respectively with the ends of the head sections.

A fastening device of this split form is useful for fastening in place a wire, cable, pipe or like object. The device may be easily applied to such an object by spreading apart its legs 4 and 5 and thus elastically bending open the clamp portion 10 until it will receive the object therewithin, and then bringing the legs together and forcing them into a mounting hole in order to fasten the clamped object in a desired location.

The embodiment of FIG. 3 is generally similar in form and utility to that of FIG. 2. It differs from the latter in that the head of the device is constituted by an article holding portion 12 of split substantially circular form having at its split ends widened base portions 12a and 12b, from which the legs 4 and 5 project backward in a spaced relationship maintained by butting inner edges of those base portions. In effect, the head sections 1a and 1b of the device of FIG. 2 are omitted from the device of FIG. 3. A wire or like object engaged in the clamp portion 12 can be fastened quite close to the surface of a wall in which the device is mounted.

FIGS. 4–8 illustrate the construction and alternative conditions and manners of use of a dual purpose fastening device embodying the invention.

This dual purpose device has a head 1 formed with a widened base 2 from which spaced apart legs 4d and 5d project backward in parallel relation, with an article holding or clasp portion 3 formed on the head, substantially as in FIGS. 1 and 2.

The leg formations of this device differ from those of the devices of FIGS. 1–3 in that each leg is formed with a backward or tail section A composed of a plurality of semi-frusto-conical segments 14, 15 and 16 joined together coaxially, and section A is joined through a reduced semi-cylindrical segment 17 with a forward section B composed of a semi-frusto-conical segment 18 connected with the base 2 of the head by a neck segment 19 of narrowed approximately semi-cylindrical form.

Figure 4:
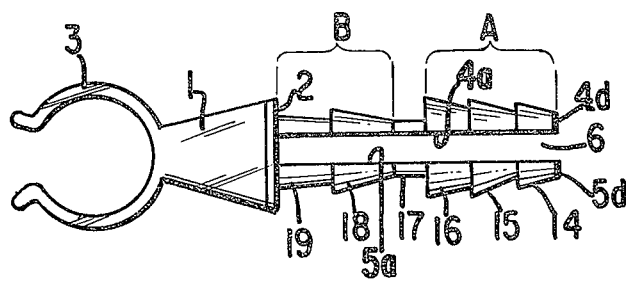
FIG. 4 and FIG. 5 are plan and side views, respectively, of an embodiment of the dual purpose fastening device according to the invention.
Figure 5:
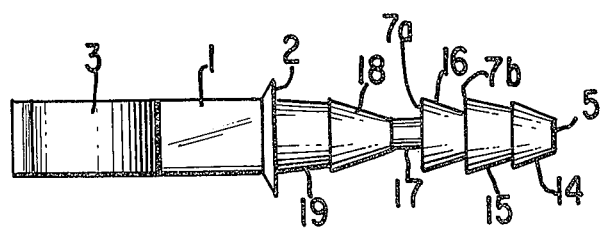

It is advantageous in a device such as the embodiment of FIG. 4 to have the neck segments 19 of the legs tapered off slightly in cross-section, thus being slightly semi-frusto-conical, in the direction from the head to the first set of protrusions formed by segments 18. It also is advantageous to form the successive protrusion-forming segments of devices according to the invention such, for example, as segments 14, 15 and 16 in FIGS. 4–6, to diameters which increase slightly in the direction from the backward ends of the legs.

Figure 6:
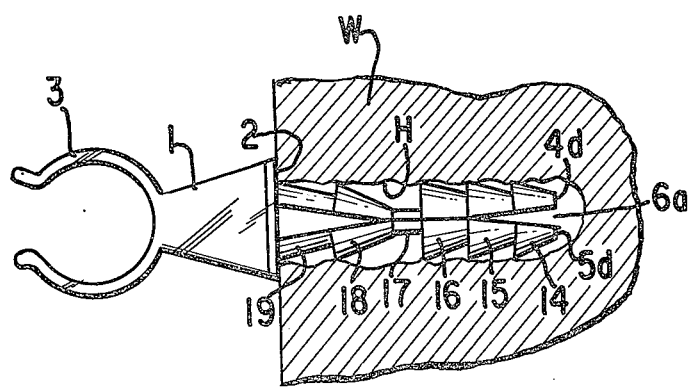
FIG. 6 is a schematic view, partly in section, of the same device as installed in a hole drilled in a wall.

In one manner of use of the fastening device of FIG. 4, as illustrated schematically in FIG. 6, the legs 4 and 5 of the device are thrust together as far as they will go, as limited by the base 2 of head 1, into a hole H of appropriate size drilled into a wall structure W. The device may be so inserted in the hole by the pressure of one's fingers bearing upon head 1. As the legs are forced into the hole the sloped surfaces of the end segments 14 acting against the wall of the hole cause the legs to be pressed together against the resistance imposed by their resiliency, and the outer edges of the several protrusions may themselves be deformed elastically inwardly to a slight extent as and if needed for entry into the hole. It results that when the device is in the hole, the neck segments 19 are elastically deformed inwardly so that they exert outwardly directed moments, or reactive forces, and the protrusions of the legs press against the wall of the hole to fasten the device securely in place. When the segments 14, 15 and 16 increase progressively in diameter, the tail section A of the device may acquire a posture in the hole such as indicated in FIG. 6, with a small tapering space 6a present between the legs near their backward ends.

Figure 7:
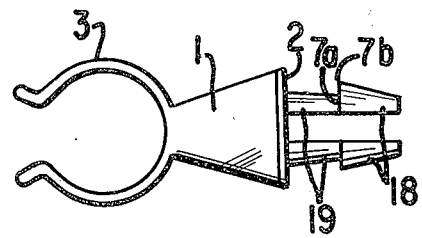
FIG. 7 and FIG. 7A are plan and side views, respectively, of the same device after removal of the tail portions of the legs.
Figure 7A:
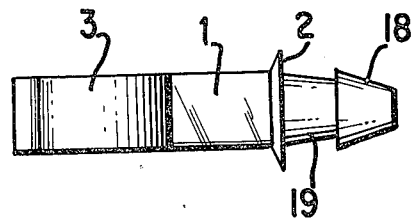
Figure 8:
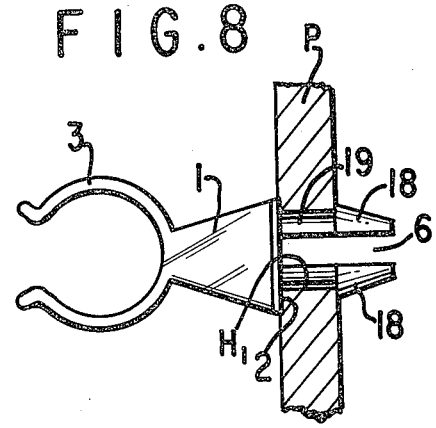
FIG. 8 is a schematic view, partly in section, of the portion of the device so shortened as installed in a shallow panel hole.

The same fastening device of FIG. 4 has an alternative manner of use, as illustrated schematically in FIG. 8, when the tail sections of its legs are removed as by being broken off or cut off at the location of the connecting segments 17. The legs of the device then consist essentially of the first set of protrusions 18 connected with the base 2 of head 1 through the neck segments 19, as seen in FIGS. 7 and 7A. The device in this curtailed form is excellently suited for being mounted in a hole H1 of a panel P, such for example as a pegboard, having a thickness slightly less than the axial length of the neck segments 19. When its legs are thrust into such a hole the wall of the hole acting against the tapered segments 18 forces these segments together against the resiliency of the neck segments and holds them converged until their outer edges 7b have moved out of the back end of the hole H1, whereupon the legs spring apart and cause the protruding faces 7a of the segments 18 to assume a locking position, such as indicated in FIG. 8, relative to the back surface of the panel bordering the hole.

The embodiments of the invention hereinabove described and illustrated in the drawing are illustrative. It will be evident to skilled persons that the invention can be embodied in various other forms of devices for various purposes or uses while still utilizing its distinctive features which are intended to be defined by the appended claims.

What is claimed is:

1. A fastening device mountable securely simply by being thrust by hand into a hole of appropriate diameter, such as one drilled in a wall, comprising a unitary molding of a resilient synthetic resin material constituting a head and a plurality of resilient legs projecting from and held by said head in spaced apart substantially parallel relation, said legs being elastically deflectable laterally independently of each other and into the space between them so that each leg will exert a reactive force by its resiliency upon being deflected laterally from its normal posture relative to said head, the confronting inner surfaces of said legs normally being substantially flat and straight and substantially parallel, each of said legs comprising outwardly directed protrusions spaced apart therealong, the diametrical distance between the outer edges of the respective protrusions of said legs in a direction across the space between the legs normally being substantially greater than said hole diameter yet, upon said legs being pressed together, being at most slightly greater than said hole diameter at locations where the legs butt each other, so that the legs can fit into the hole, said legs being sufficiently resilient that upon being thrust together into the hole at least some of their protrusions will press outwardly and grip against the wall of the hole, each of said legs comprising forward and backward sections thereof interconnected by an intermediate segment thereof, each said backward section being constituted by several segments of approximately semi-frusto-conical shape joined together coaxially with their respective bases facing away from the free end of the leg, each said forward section being constituted by a first segment of approximately semi-frusto-conical shape and a neck segment of lesser radial extent connecting the base of said first segment with a base portion of said head, said leg protrusions being formed by said approximately semi-frusto-conical segments, said intermediate segments being readily severable for removal of said backward sections from the device whereby the remnant device may be readily mounted in a hole shallower than the length of said neck segments by converging said first segments in and thrusting them through the hole.

2. A fastening device according to claim 1, said head comprising a resilient article-retaining portion of looped form and two separate sections which normally butt each other and form a split base portion of said head which is wider than said hole, each end of said looped portion being joined with one of said sections and each of said sections having one of said legs joined thereto, whereby upon a spreading of said legs said looped portion can be resiliently opened to receive an elongate object which will be clamped therewithin upon reconvergence of said legs.

3. A fastening device according to claim 1, said diametrical distance at said locations when said legs are pressed together being slightly less for the protrusions adjacent the ends of said legs than it is for others of said protrusions.

4. A fastening device according to claim 1 for mounting in a hole of approximately 4 mm. in diameter, said legs being spaced apart by a distance of about 1.5 to 2 mm. and said diametrical distance normally being of about 7 mm. for at least some of said protrusions.

5. A fastening device mountable securely simply by being thrust by hand into a hole of appropriate diameter, such as one drilled in a wall, and constituted by a unitary molding of a thermoplastic polyamide resin comprising a head and a pair of resilient legs projecting from and held by said head in spaced apart substantially parallel relation, said head comprising a base portion wider than said hole, from which said legs project backward, and an article-retaining portion for supporting a tool or like object, said legs being elastically deflectable laterally independently of each other and into the space between them so that each leg will exert a reactive force by its resiliency upon being deflected laterally from its normal posture relative to said head, each said leg comprising several leg segments of approximately semi-frusto-conical shape which are united coaxially with their respective bases facing away from the free end of the leg so that they constitute axially sloped, transversely arched protrusions spaced apart along the leg, the inner surface of each leg normally being substantially flat and straight, said segments respectively of the two legs lying opposite one another so that their cross-sectional outline normally is approximately oval, the diametrical distance between the outer edges of the respective protrusions of said legs in the directions across said space normally being substantially greater than said hole diameter yet, upon said legs being pressed together, being only slightly greater than said diameter at locations where the legs butt each other, each said leg comprising forward and backward sections thereof interconnected by an intermediate segment thereof, each said backward section being constituted by said several leg segments and each said forward section being constituted by a first segment of approximately semi-frusto-conical shape and a neck segment of lesser radial extent connecting the base of said first segment with a base portion of said head, said intermediate segments being readily severable for removal of said backward sections from the device whereby the remnant device may be readily mounted in a hole shallower than the length of said neck segments by converging said first segments in and thrusting them through the hole.

* * * * *